July 14, 1942.  E. H. LAND  2,289,714
LIGHT-POLARIZING IMAGE IN FULL COLOR
Filed June 7, 1940   5 Sheets-Sheet 1

INVENTOR.
Edwin H. Land
BY Donald L. Brown
Attorney

July 14, 1942.  E. H. LAND  2,289,714
LIGHT-POLARIZING IMAGE IN FULL COLOR
Filed June 7, 1940  5 Sheets-Sheet 4
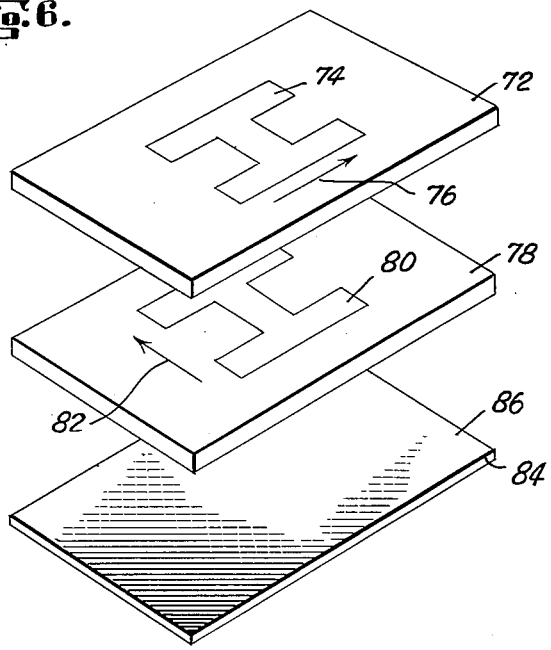
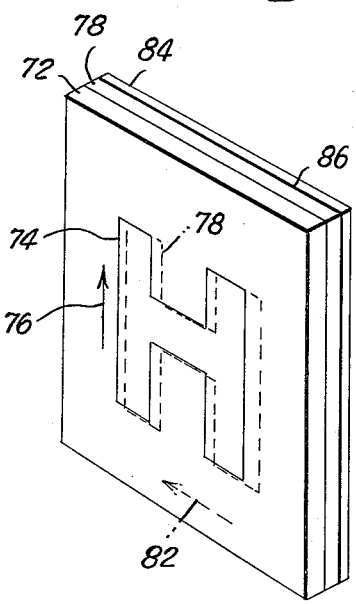
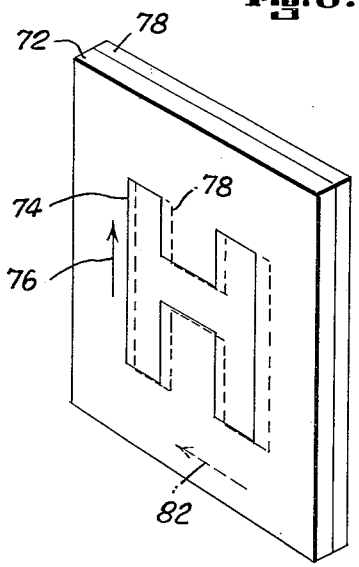
INVENTOR
Edwin H. Land
BY
Donald C. Brown
ATTORNEY Patented July 14, 1942

2,289,714

UNITED STATES PATENT OFFICE 2,289,714

LIGHT-POLARIZING IMAGE IN FULL COLOR

Edwin H. Land, Boston, Mass., assignor to Polaroid Corporation, Dover, Del., a corporation of Delaware Application June 7, 1940, Serial No. 339,250

32 Claims. (Cl. 88—16.4)

This invention relates to new and improved full-colored prints, images, designs or the like formed of dichroic material.

An object of the invention is to provide an image formed by means of dichroic material in a light-transmitting plastic, the photographic contrast of the said image being a function of both the direction of vibration of transmitted light and of the wave length of said light.

Other objects of the invention are to provide such an image formed in a linear hydrophilic polymeric plastic whose molecules have been substantially oriented; to provide such an image formed by means of the adsorption of direct cotton dyes by the molecules of said plastic; to provide such an image formed by the adsorption by the molecules of the plastic of water-soluble direct cotton dyes from the class consisting of the dyes having elongated molecules containing a system of linear conjugated double bonds, uninterrupted at least over the greater part of the length of the molecule, or at most interrupted by an —NH— group; to provide such an image formed by the adsorption of substantive, strongly dichroic dyes of the type described; to provide such an image which has a density for the transmitted component which is a minimum and which approaches 0 over the entire visible wave length band; to provide such an image which has a density for the absorbed component which is substantially the same function of wave length as is the case in a standard two-color or three-color printing process; to provide such an image in which at least the higher of the absorption coefficients for the two rectangular components of transmitted light is a function of wave length; to provide such an image in which the ratio of densities for the said two components of transmitted light is high; to provide such an image by applying to a plastic of the character described three subtractive dyes of the azo type.

Other objects of the invention are to provide superimposed dichroic stereoscopic right and left eye prints or images of the character described; to supply such prints or images as transparencies in the form of motion picture film for the projection of stereoscopic pictures or in the form of prints provided with a non-depolarizing reflecting backing.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the invention, reference should be had to the accompanying drawings, in which:

Figure 1 is a diagrammatic representation of motion picture film comprising two superimposed dichroic stereoscopic images, each complete image comprising three superimposed partial images, one formed in a minus red dye, one in a minus blue dye, and one in a minus green dye, the entire assemblage comprising six separate image-bearing sheets or film strips which have been laminated to form a unitary product;

Fig. 6 is a diagrammatic exploded view in perspective of a transparent stereoscopic print embodying the present invention and a non-depolarizing reflecting backing therefor;

Fig. 7 is a perspective view of the elements of Fig. 6 in assembled condition;

Fig. 8 is a perspective view of a stereoscopic transparency or print without a reflecting backing.

Figure 1:
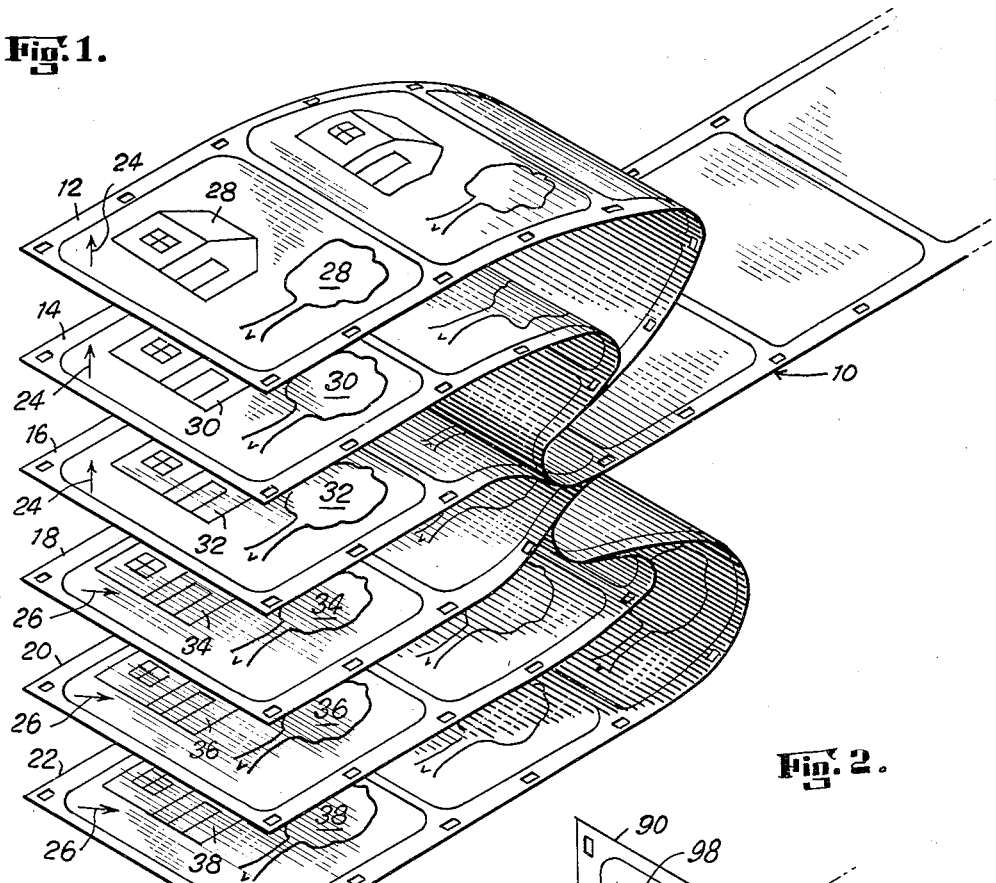

A suitable base material in which the prints or images of the present invention may be readily formed is a plastic, and preferably a plastic from the class consisting of the linear hydrophilic polymers, such for example as polyvinyl alcohol, polyvinyl acetal, and regenerated cellulose. Of the materials falling within this class the preferred material is polyvinyl alcohol, and prints or images formed with that material as the base possess the highest dichroism and hence are most suitable in the production of superimposed right and left eye stereoscopic images and in the production of stereoscopic prints, images, motion picture film and the like in full color.

Sheets of polyvinyl alcohol or the other selected plastic material should be prepared for the reception of the dyes and the formation of the dichroic image therein by substantially orienting the molecules of the plastic sheet in a predetermined direction. This may generally be accomplished by softening the sheet, as for example by subjecting it to heat, or to the action of a softening agent, until the sheet may be stretched or extended, and then by stretching or extending the sheet until suitable orientation of the molecules has been obtained. In the case of polyvinyl alcohol, for example, a sheet of the material formed by a casting process may be placed in condition for the formation of the dichroic images therein by extending the sheet to from two to four or five times its length. The orientation of the molecules of the sheet secured by such extension has been found adequate and is in fact preferred.

Dichroic images in full color may be obtained by any of several processes in which dyes are applied to or formed in predetermined portions of the plastic sheet. A preferred process contemplates the use of three subtractive dyes—a minus red, a minus green, and a minus blue dye forming respectively the cyan, magenta, and yellow components of the full-color image. These dyes may be transferred from a gelatine relief or a half-tone plate or other carrier to one or several sheets of the prepared plastic material, and if proper dyes are selected they are adsorbed by the plastic and form dichroic images. In certain modifications of the invention, and particularly where superimposed right and left eye dichroic images in full color are provided to form a stereoscopic print or image, strongly dichroic materials are preferred. Dyes should be selected, when such a product is contemplated, which show high dichroism when applied to a properly oriented sheet of the plastic material, such as polyvinyl alcohol, and moreover the preferred dyes for use in the manufacture of such a product will be those showing a minimum absorption for one component of the transmitted light, and showing a density for the other component of the transmitted light which is substantially the same function of the wave length of that light as is the density of a corresponding dye used in any standard isotropic color-printing process. Such preferred dyes should show a relatively high density ratio for the absorbed and unabsorbed components of transmitted light.

Speaking generally, the most satisfactory dyes for use in the production of the present invention are to be found in the group of direct cotton dyes. These dyes may be applied directly to the plastic sheet, for example to a sheet of polyvinyl alcohol, from water solution. With the exception of a few dyes of the thiazole class, practically all these dyes contain at least one azo group, —N=N—. As has already been indicated, dyes should be employed which show substantivity for the plastic which is to be treated. These substantive dyes generally comprise elongated molecules containing a system of linear conjugated double bonds, uninterrupted at least over the greater part of the length of the molecule, or at most interrupted by an —NH— group.

Of the substantive direct cotton dyes which are preferred in the formation of the product of the present invention, dyes showing the highest dichroism are to be found, with few exceptions, in the disazo, stilbene, trisazo, monoazo, thiazole, and pyrazolone groups.

Minus red dyes suitable for the formation of the cyan component, where a three-color process is employed, are Niagara Sky Blue 6B (Color Index 518), Niagara Blue NR, and Niagara Sky Blue (C. I. 520).

Minus green dyes suitable for forming the magenta component, where such a process is employed, are Solantine Pink 4BL (C. I. 353), Solantine Red 8BL (C. I. 278), Geranine GL, Pontamine Fast Pink GGN (C. I. 126), Erie Pink 2B (C. I. 128), and Pontamine Fast Pink EB ex (C. I. 130).

Minus blue dyes suitable for forming the yellow component in a process of the type described are Solantine Yellow 4GL, Solantine Yellow FF (C. I. 814), Stilbene Yellow 3GA (C. I. 622), Erie Yellow Y (C. I. 365), and Erie Yellow KM (C. I. 411).

The dyes which have been listed and which have been selected from the broader group of previously defined dyes are to be understood as typical only and not as an exclusive list. It is furthermore to be understood that the dyes listed have been selected because of their suitability in one form of the invention, for example in a three-color print. If a two-color process is to be employed, different dyes may be used with advantage. A suitable combination for a two-color process for example would be Niagara Sky Blue 6B (C. I. 518) and Pontamine Diazo Orange (J-acid derivative).

It is also to be understood that if the product which is to be formed is a stereoscopic print in which a left eye image overlies a right eye image, the dyes which are employed should show a minimum absorption for the transmitted component in order that no double image may be produced, whereas this requirement is not so stringent if the product to be produced is merely a dichroic full-colored image or print which is not used as one member of a stereoscopic pair. It will thus be apparent, particularly in the production of stereoscopic prints, that the dyes selected must not only be correct as to shade in so far as the absorbed component is concerned, but they must also show high dichroism with low absorption for the transmitted component. Dyes which are currently used in isotropic three color processes are not direct dyes and are generally not suitable for use in the formation of the product of the present invention.

A product embodying one form of the present invention is shown diagrammatically in Fig. 1, which illustrates a composite motion picture film 10 made up of six superimposed separate layers or strips 12, 14, 16, 18, 20 and 22, which are bonded together to form a suitable product. These strips or films may comprise properly oriented polyvinyl alcohol, the direction of orientation of the molecules of the separate sheets being indicated by the arrows 24 and 26. The sheets 12, 14 and 16 are made up of material in which the molecules are oriented in substantially the same direction. As shown in Fig. 1, this direction is substantially at an angle of 45° to the edge of the strips. The sheets 18, 20 and 22 are made up of material oriented uniformly and in a direction substantially at right angles to the direction of orientation of the material in sheets 12, 14 and 16. Each group of three sheets, i. e., the group comprising the sheets 12, 14 and 16, and the group comprising the sheets 18, 20 and 22, carries a succession of superimposed light-polarizing images, each comprising a dichroic, color component of the full color image to be reproduced. The images of the first group, indicated generally at 28, 30 and 32, are formed one from a minus red dye, one from a minus blue dye, and one from a minus green dye. These images are in effect dichroic color prints which when superimposed, as in the formation of the finished film 10, give a dichroic colored print or a series of such prints in full colors. The dyes which have already been described may be employed in processes hereinafter to be explained to form these images. As shown in Fig. 1, the images 28, 30 and 32 may be either right eye or left eye stereoscopic images.

The images on the second group of three sheets, 18, 20 and 22, shown generally as at 34, 36 and 38, may also be formed one of a minus red dichroic dye, one of a minus green dye, and one of a minus blue dye, and when superimposed, as in the formation of the composite strip 10, these images or prints provide a full color dichroic image which, in the device shown in Fig. 1, may be either a left eye or right eye stereoscopic image. It is of course to be understood that if the image formed by the composite of one group of sheets, for example the sheets 12, 14 and 16, is a right eye stereoscopic image, the image formed by the composite of the other group of sheets 18, 20 and 22 is to be a left eye stereoscopic image.

While for the purpose of clarity the elements forming one image have been shown in juxtaposed relation, it is to be understood that such arrangement is not essential, and the elements may be assembled in any desired order. For example the left and right eye elements of a single color component may be on adjacent sheets or on opposite sides of the same sheet, for convenience in dyeing.

Figure 3:
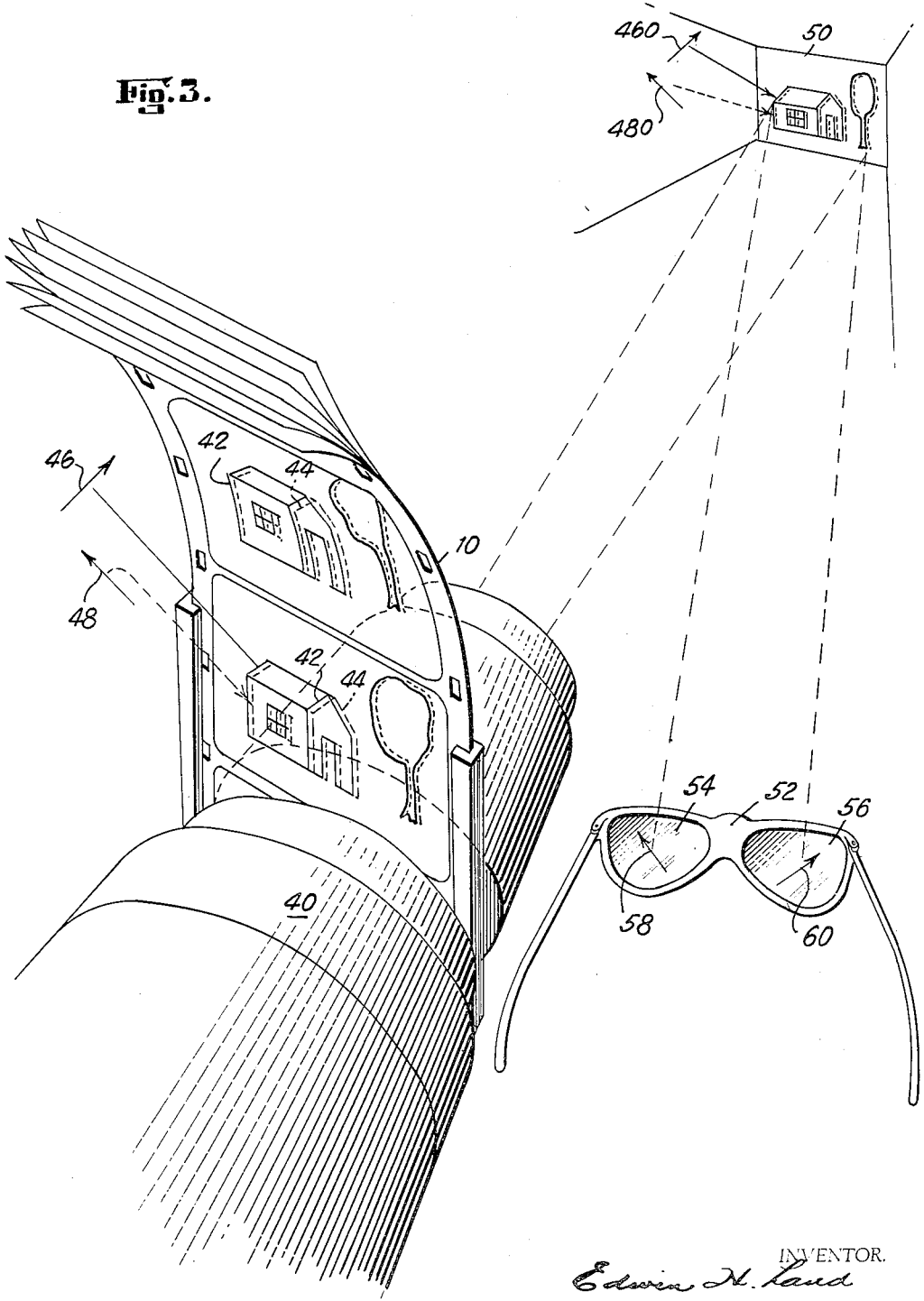
Fig. 3 is a diagrammatic representation of a projector, screen and viewing device utilizing the full-color streoscopic dichoic film illustrated in Fig. 1.

In Fig. 3 there is shown diagrammatically a device 40 for the projection of images from motion picture film. The composite film 10 is shown as being fed through the film gate of the device 40. The left eye stereoscopic image of each frame of the strip 10 in Fig. 3 may be understood as shown in solid lines, as at 42, and the right eye stereoscopic image may be understood as shown in dotted lines, as at 44.

The arrows 46 and 48 are indicative of the directions of orientation of the molecules in the sheets carrying respectively the left eye stereoscopic image 42 and the right eye stereoscopic image 44. The arrow 48 in Fig. 3 is to be understood as corresponding to the arrows 24 in Fig. 1, and as indicating a direction of orientation substantially at 45° to the edge of the film strip. The arrow 46 in Fig. 3 is understood to correspond to the arrow 26 in Fig. 1, and to indicate that the left eye stereoscopic image has its polarizing axis substantially at right angles to the polarizing axis of the right eye stereoscopic image.

The superimposed images are projected on to a non-depolarizing screen 50, where they retain their polarization characteristics, as indicated again by the arrows 480 and 460, which represent the directions of vibration of light forming the two superimposed images.

The luminous image on the screen is one of low contrast and low color saturation and is rendered in terms of wave length and degree of polarization. Its appearance is converted into that of an image rendered in full color and full saturation by viewing through suitable analyzers.

An observer wearing a viewing screen of the type shown at 52, wherein two uniformly polarizing neutral analyzers 54 and 56 are provided, one positioned in front of each eye of the wearer, the left eye analyzer 54 having its axis 58 crossed with the polarizing axis 46 of the left eye image 42, and the right analyzer 56 having its polarizing axis 60 crossed with the polarizing axis 48 of the right eye image 44, will see only the left eye image with the left eye, and only the right eye image with the right eye. A stereoscopic effect is thus produced.

Figure 4:
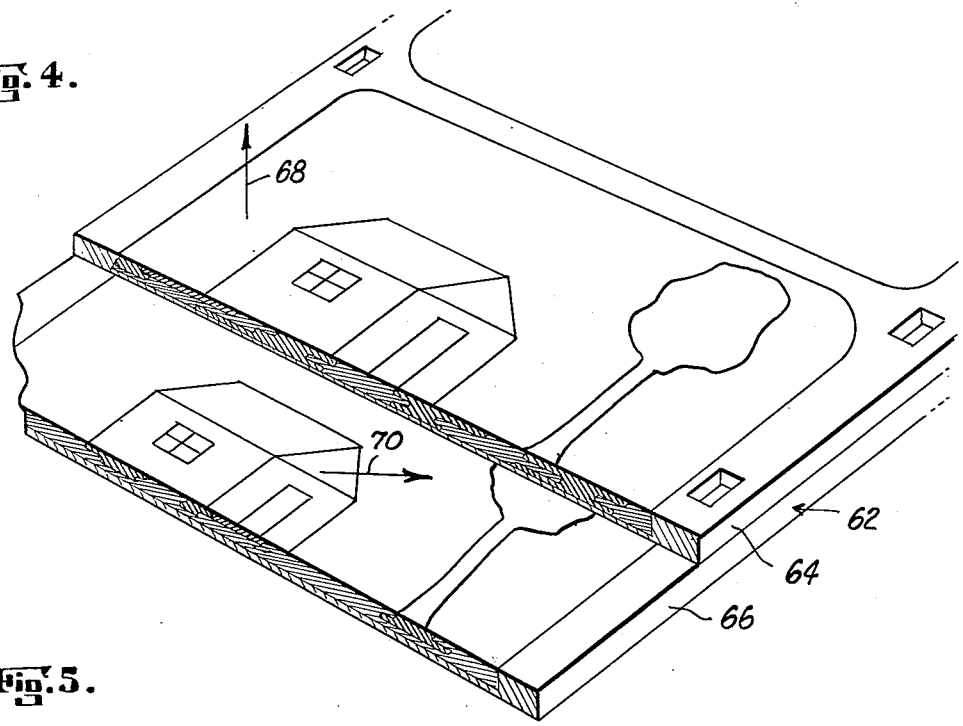
Fig. 4 is a diagrammatic view in perspective of a product similar to that disclosed in Fig. 1, comprising, however, two superimposed plastic layers, each of which has been printed successively with the three subtractive dichroic dyes employed in producing the product of the present invention.

The stereoscopic film shown in Figs. 1 and 3 has been described as comprising six separately printed layers or sheets which are then assembled in proper superimposed relation and bonded together. In a modified form of the invention, that shown for example in Fig. 4, film of the character described may be formed from two sheets only. In this drawing, 62 represents generally a motion picture film or other transparency formed of two overlying layers 64 and 66 of a suitable plastic, for example polyvinyl alcohol. The direction of orientation of the molecules of the layer 64, as indicated by the arrow 68, is substantially at right angles to the direction of orientation of the molecules of the layer 66, as indicated for example by the arrow 70, and as shown in Fig. 4 these directions may make angles of 45° with the edges of the composite film 62. One eye image, either the left or right eye image, of a stereoscopic print may be formed in the sheet 64 in full colors by successively or simultaneously dyeing predetermined portions of the sheet with a minus red, a minus green, and a minus blue dye in ways hereinafter to be described, and the opposite eye image may be formed in sheet 66 by successively or simultaneously dyeing predetermined portions of that sheet with the same dichroic dyes. The single sheet 64 or 66 is the full equivalent of the groups of sheets 12, 14 and 16 or 18, 20 and 22 of Fig. 1.

In the devices shown in Figs. 1, 3 and 4, the dichroic or polarizing axes of the images formed in the superimposed sheets are shown as positioned at 45° to the edge of the sheet. This is a preferred but not a necessary condition. In Figs. 6, 7 and 8, for example, the polarizing axes of the dichroic prints, there also represented by arrows, are shown as parallel and perpendicular to the same edge of the print or sheet in which the image is formed. It is essential only in the formation of stereoscopic prints that the polarizing axes of the two prints be at right angles to each other.

Fig. 6 represents diagrammatically and in exploded form the three elements of a preferred stereoscopic print. 72 represents a sheet or film carrying either the left or right eye stereoscopic print 74 in full color and formed in the sheet 72 by dyeing or staining the sheet with selected dichroic dyes of the class heretofore defined. The polarizing axis of the sheet is indicated as lying in the direction of the arrow 76. The sheet 78 is a similar plastic sheet carrying the other dichroic eye image 80 and having its polarizing axis or the direction of orientation of its molecules at right angles to that of the sheet 72, as indicated by the arrow 82. 84 represents means, for example a sheet of paper, providing a non-depolarizing light-reflecting surface 86, made for example by coating the paper with aluminum flake suspended in a plastic.

The three elements are shown in superimposed relation in Fig. 7. The plastic layers may be bonded together and then bonded to the sheet 84. The latter bond should preferably be effected by using an adhesive which has a refractive index approximating the refractive index of the plastic sheets. Where polyvinyl alcohol is employed to form the plastic sheets 72, 78, the adhesive for affixing thereto the coated paper layer 84 may comprise polyvinyl acetal or Vistanex, or acrylic acid esters, or any other suitable adhesive. Where an adequately hard adhesive is employed, it may be used conveniently as a waterproofing coating for the outer, exposed surface of the assembly.

Fig. 8 illustrates a transparency made by bonding together the sheets 72, 78 of Figs. 6 and 7 without providing the light-reflecting backing sheet. Such a device may be employed, for example, in the projection of stills or may be viewed directly against a light source.

It is to be understood that a reflecting backing may be applied to the two bonded overlying plastic layers by direct application of a suitable non-depolarizing paint, such as aluminum flake, in suspension to either surface of the combined layers 72, 78.

Figure 2:
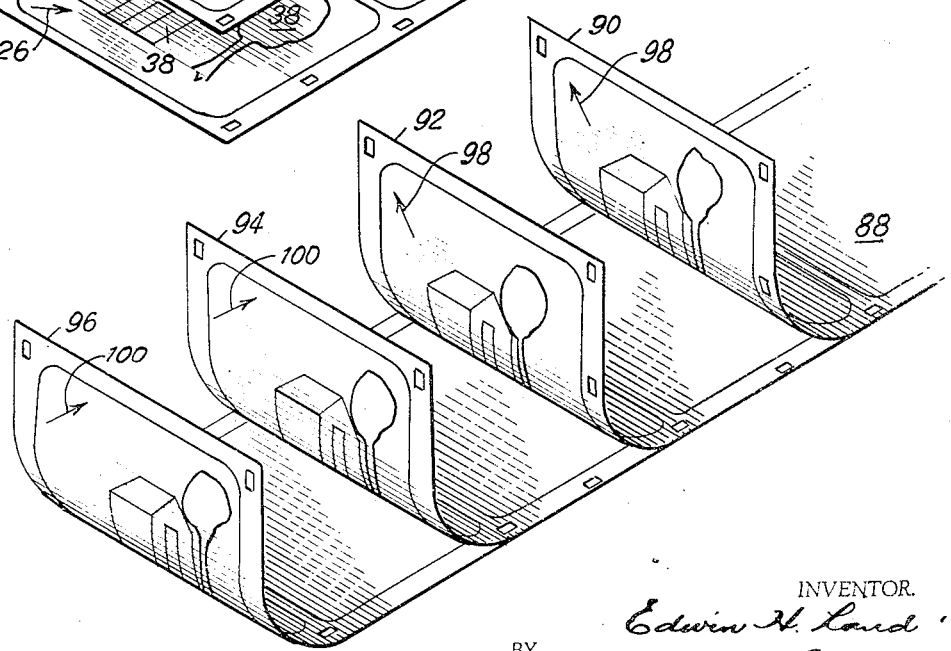
Fig. 2 is a diagrammatic representation of a similar motion picture film employing a two-color process and comprising four superimposed laminated image-bearing strips of film.

The products of the present invention heretofore described have comprised full color dichroic images formed by using three dyes. As was previously pointed out, a two-color process may be employed. The product of such a process is shown in Fig. 2, which is intended to illustrate a composite motion picture strip 88 corresponding generally to the strip 10 of Fig. 1, but made up of four overlying layers 90, 92, 94 and 96 instead of the six layers shown in Fig. 1. Two of the layers shown in Fig. 2, for example the layers 90 and 92, may carry the left eye images, one formed in the bluish green dye previously mentioned, and the other in the reddish orange dye previously mentioned for use in connection with the two-color process, or in any other suitable dyes for use in such a process. The other two sheets, 94 and 96, may carry the other two dyed dichroic stereoscopic images. As shown in Fig. 2, one pair of sheets has its molecular orientation, indicated by the arrows 98, substantially at right angles to the molecular orientation of the other pair of sheets, indicated by the arrows 100. It will of course be apparent that the use of the two-color process may be applied equally to the single sheet type of print shown, for example, in Figs. 4 and 6 to 8 inclusive. In such a product the two dyes forming the image would be successively or simultaneously applied to the same properly prepared linear polymeric plastic, and the two separate plastic sheets, one carrying the left eye and the other the right eye image of a stereoscopic pair, would then be bonded together.

Figure 9:
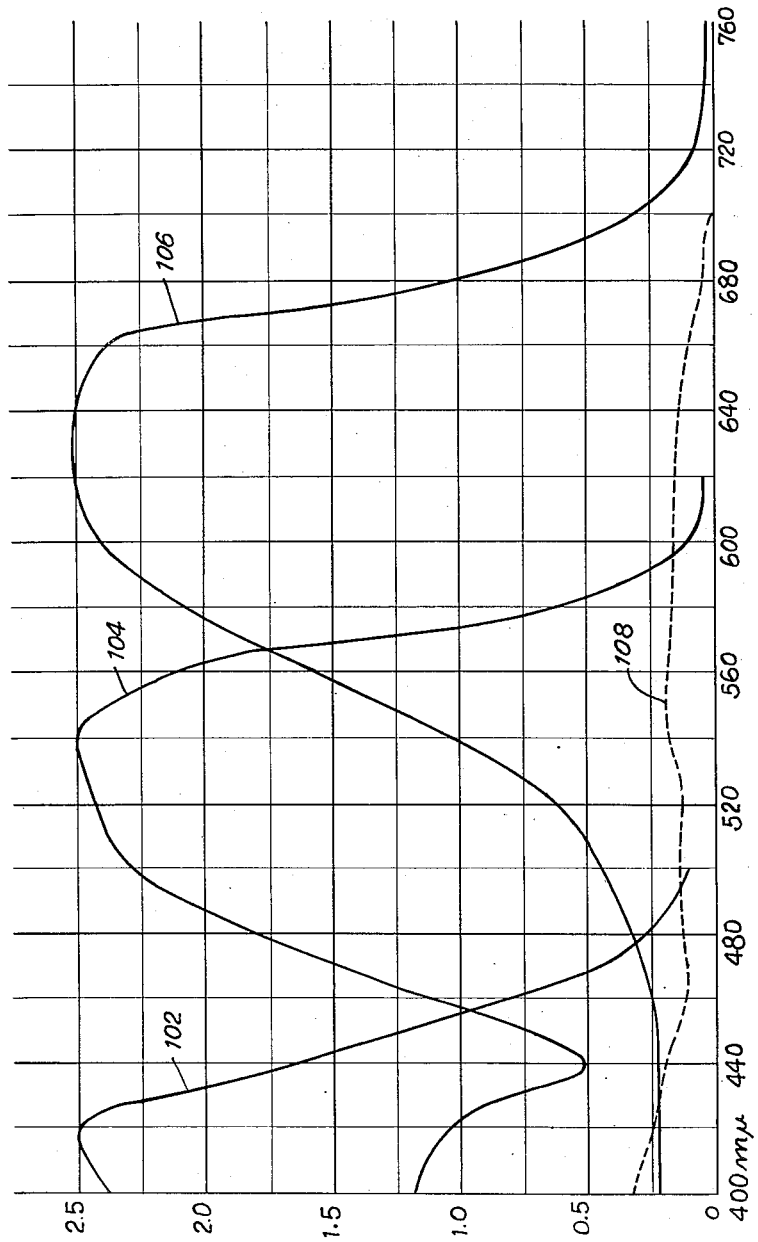
Fig. 9 represents the absorption curves for a triplet of selected dyes employed in forming the product of the present invention on substantially oriented polyvinyl alcohol, the maximum density of each dye for the absorbed component of the transmitted light being arbitrarily set at 2.5.

In Fig. 9 there are shown the absorption curves for three selected dyes employed in forming that embodiment of the invention first described as comprising a three-color dichroic print. The plotted curves illustrate the absorption of substantially oriented polyvinyl alcohol dyed with Solantine Yellow FF (C. I. 814), Solantine Red 8BL (C. I. 278), and Niagara Sky Blue 6B (C. I. 518), curve 102 representing the absorption curve for Solantine Yellow FF, curve 104 the absorption curve for Solantine Red 8BL, and 106 the absorption curve for Niagara Sky Blue 6B. The maximum density for each curve for the absorbed component, i. e., the component vibrating parallel to the direction of substantial orientation of the molecules of the sheet of polyvinyl alcohol stained with the dye, has been set arbitrarily at 2.5, densities being shown in the vertical column at the left of the curves. The numbers at the bottom of the diagram represent millimicrons, and indicate the wave length of the transmitted light. The diagram also shows in dotted lines a curve 108, which represents the sum of the densities of the three components for the component of transmitted light vibrating perpendicularly to the direction of orientation of the molecules of the sheet of polyvinyl alcohol. It will be apparent that in the case of the three dyes selected the sum of the densities for this component is small, averaging somewhere in the neighborhood of 0.15.

Hence it will be apparent that the ratio of densities of the absorbed component to the unabsorbed component for each dye selected is high. Preferably, the dyes selected for use in the present invention should show, on oriented polyvinyl alcohol, a ratio of densities of the absorbed component to the unabsorbed component of at least approximately 5 to 1, and the ratio of densities may be 25 to 1, or even higher. This ratio, for superimposed dichroic stereoscopic prints, should preferably be at least 10 to 1. The ratio of densities or dichroic ratio, it is to be understood, is usually not constant over the full wave length band. Reference here to the ratio of densities or dichroic ratio refers to the maximum ratio found within the half width of the absorption band. An examination of Fig. 9 will show also that the higher of the absorption coefficients for the two rectangular components of transmitted light, i. e., the absorption coefficient indicated by the curves 102, 104 and 106, is a function of wave length in the visible spectrum, and the density of the dichroic image made from these dyes for the absorbed component is substantially the same function of wave length as is the case in a standard three-color isotropic printing process.

Dichroic prints embodying the product of the present invention, whether or not stereoscopic, may be formed in one of several ways. The sheet of substantially oriented polyvinyl alcohol or other linear hydrophilic polymer may have transferred to it from a standard dye colloid relief, such as a standard gelatine wash-off relief, the dichroic dye or dyes which are to form the desired image. In the case of the three-color process, three gelatine reliefs may be made, one for the cyan component, one for the magenta component, and one for the yellow component. The suitable dye may be imbibed in each relief, and the reliefs successively pressed against separate thin films of the polyvinyl alcohol, as in Fig. 1, or the same film as in Fig. 4. Or a single colloid layer carrying the full color image may be pressed against the prepared plastic sheet. Where separate dichroic images are formed for each component in separate films, the films may then be assembled and bonded together to form a suitable full-color dichroic image.

In applying the water-soluble dichroic direct cotton dye to the oriented polyvinyl alcohol from the relief, through the resist or the like, care should be taken not to dissolve unduly the polyvinyl alcohol in the process, for the dichroism of the finished image may be adversely affected by such dissolving. The absorption of the transmitted component may be increased, and that of the absorbed component may be decreased, thus considerably decreasing the ratio of densities of the image for the two components. This can be prevented by adding organic solvents, such as alcohols or soluble inorganic salts, or both, to the solutions from which the dye or its components are applied to the plastic sheet.

Another method of producing dichroic images or prints embodying the present invention is by the use of a diazotype process. Here a solution of a light-sensitive diazotized base, for example one of the commercially available "fast color salts" used in the textile industry, may be imbibed on to oriented polyvinyl alcohol film. The printing is done by exposing to light, as for example through a positive transparency, the exposed portions of the fast salt being destroyed. The dichroic image is subsequently developed by coupling the unexposed and undestroyed fast salt with an amine or a phenol to yield a direct dye. The fast salt selected must be capable of yielding a direct dye or dyes, as for example Naphthanil Diazo Black B, Fast Blue Salt BB, or Naphthosol Fast Blue Salt B (C. I. 499). The coupler used should be capable also of yielding a direct dye. A suitable coupler with the Diazo Black B salt referred to for producing a minus blue dye is phenol, a suitable coupler with the said salt for producing a minus green is m-phenylenediamine, and a suitable coupler with the said salt for producing a minus red is SS acid. It should be noted that the class of couplers used generally in the textile industry with the fast color salts, namely the Naphthol AS couplers, are not suitable in the process described. It should also be understood that the coupling component may if desired be mixed into the fast salt solution prior to forming the light-sensitive layer by imbibition on the substantially oriented polymeric plastic. In this case development (coupling) is effected after exposure by treatment with alkali.

A still further process suitable for forming the product of the present invention is one closely similar to the discharge or bleaching method employed in the textile industry for forming designs and the like. The direct dyes used in the production of the dichroic prints are readily bleached or discharged by well known agents, such as Rongalite (sodium hydrosulfite plus formaldehyde) or by stannous chloride. The discharging agent may be applied to a uniformly dyed sheet of oriented polyvinyl alcohol from a colloid relief or the like, thus forming the image in the sheet by destroying or bleaching or discharging to the desired density the direct dichroic dye. If separate sheets are used for the separate dye components they may be then assembled in the manner shown, for example, in Fig. 1 to produce the desired full-color dichroic image.

These and other processes are not made the subject of this application, but are here described in order that there may be no doubt as to how the products claimed herein may be produced.

Figure 5:
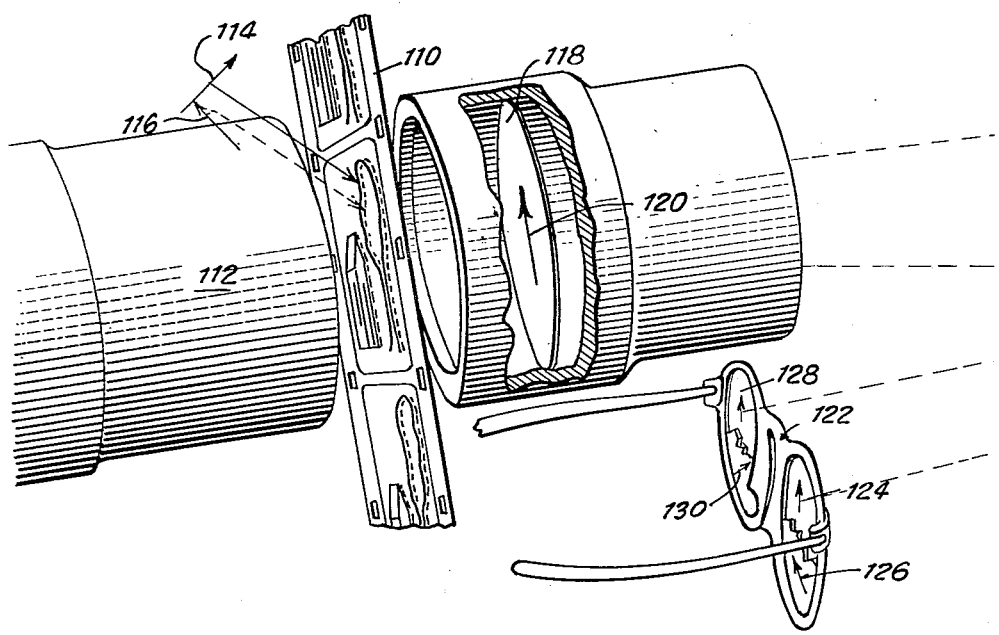
Fig. 5 is a diagrammatic representation, with parts broken away, of a modification of a portion of the device shown in Fig. 3, illustrating in connection therewith means for projecting and viewing the product of the present invention in circularly polarized light.

In Fig. 5 there is disclosed a modified form of projector and viewing device wherein the images of the present invention are projected in circularly polarized light and viewed through suitable circularly polarizing analysers. The film carrying the dichroic stereoscopic left and right eye images is shown generally as at 110. The projector itself is shown generally as at 112. The arrows 114 and 116 represent the dichroic axes of the left and right eye images on the film. As shown these axes are at angles of 45° to the vertical and horizontal and are at right angles to each other. In front of the film and between it and the screen on which the images are projected, there is interposed a quarter-wave retardation device 118, with its principal optical direction bisecting the angle between the dichroic axes of the left and right eye images on the film 110. The principal optical direction of the element 118 is shown in Fig. 5 as extending vertically, and is represented by the arrow 120. In the projection of the two superimposed images, light forming the left eye image is polarized by transmission through the sheet 10 so as to vibrate, for example, in the direction shown by the arrow 114. The axis of the quarter-wave device 118 is positioned at 45° in a counter-clockwise direction to this direction of vibration, and hence converts the light into counter-clockwise rotating circularly polarized light. The light forming the right eye stereoscopic print or image is vibrating in the direction shown by the arrow 116 and with respect to this direction the axes of the quarter-wave plate is positioned at an angle of 45° in a clockwise direction, so that this light is converted into clockwise rotating circularly polarized light.

With this device the viewing glasses used, 122, should comprise a right eye lens formed of a quarter-wave device 124 and a neutral polarizing device 126 with the quarter-wave device on the outer surface of the polarizer and preferably with the axis of the polarizer parallel to the dichroic axis of the right eye image on the film 110 and the axis of the quarter-wave plate parallel to the axis of the quarter-wave plate 120 in the projector. The left eye lens should comprise similarly a quarter-wave plate 128, preferably with its axis parallel to the axis of the quarter-wave device 118 and behind it a neutral light-polarizing element 130 with its polarizing axes parallel to the axis 114 of the dichroic left eye image on the film 110.

It will be apparent that the device shown in Fig. 5 is applicable equally to the projection of black and white dichroic stereoscopic images where the images are superimposed on a film or transparency, and it will be apparent also that in every case where this specification has referred to motion picture film or projectors the devices described are adapted for use in the projection of still pictures.

Since certain changes may be made in the above article and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. In combination, a sheet of a transparent linear, hydrophilic, polymeric plastic and means comprising dichroic light-polarizing material forming therein a predetermined image, said dichroic material being substantially uniformly axially oriented, at least the higher of the absorption coefficients thereof being a function of wave length, the optical density of said image being a function of both the direction of vibration of light incident thereon and of the wave length of said light.

2. In combination, a transparent sheet of polyvinyl alcohol and means comprising dichroic light-polarizing material forming therein a predetermined image, said dichroic material being substantially uniformly axially oriented, at least the higher of the absorption coefficients thereof being a function of wave length, the optical density of said image being a function of both the direction of vibration of light incident thereon and of the wave length of said light.

3. In combination, a sheet of a transparent plastic material and means comprising a molecularly oriented, dichroic sorption complex of a direct cotton dye incorporated with said sheet and forming therein a predetermined image, at least the higher of the absorption coefficients of said complex being a function of wave length, the optical density of said image being a function of both the direction of vibration of light incident thereon and of the wave length of said light.

4. In combination, a sheet of a transparent plastic material and means comprising dichroic light-polarizing material forming therein a predetermined image, said dichroic material being substantially uniformly axially oriented and at least the higher of the absorption coefficients thereof being substantially the same function of wave length as is the absorption of dyes used in a three-color isotropic print, the optical density of said dichroic image being a function of both the direction of vibration of transmitted light and of the wave length of said light.

5. Means providing a light-polarizing image in full color comprising a sheet of a transparent linear hydrophilic plastic, said plastic carrying a plurality of dichroic color components of said image, each said component comprising a molecularly oriented sorption complex of a dichroic dye, the directions of molecular orientation of said complexes being substantially parallel and said components being positioned in substantial registry to form said image.

6. Means providing a light-polarizing image in full color comprising a sheet of a transparent linear hydrophilic plastic, said plastic carrying a plurality of dichroic color components of said image, each said component comprising a molecularly oriented sorption complex of a dichroic dye from the class consisting of the water-soluble direct cotton dyes having molecules containing substantially uninterrupted systems of conjugated double bonds, the directions of molecular orientation of said components being substantially parallel and said components being positioned in substantial registry to form said image.

7. Means providing a light-polarizing image in full color comprising a sheet of a transparent hydrophilic plastic, said plastic carrying a plurality of dichroic color components of said image, each said component comprising a molecularly oriented sorption complex of a dichroic dye, the directions of molecular orientation of said complexes being substantially parallel and said components being positioned in substantial registry to form said image, all of said components being positioned immediately adjacent the same surface of said plastic.

8. Means providing a multi-colored, light-polarizing image comprising a sheet of polyvinyl alcohol having its molecules oriented, said sheet carrying a plurality of dichroic color components of said image, each said component comprising the sorption complex on polyvinyl alcohol of a direct cotton dye of the class consisting of the direct cotton dyes having substantially uninterrupted systems of conjugated double bonds, said dyes having a ratio of densities of the absorbed component of transmitted light to the unabsorbed component thereof in excess of 5 to 1.

9. Means providing superimposed right eye and left eye light-polarizing stereoscopic images in full color comprising overlying layers of molecularly oriented polyvinyl alcohol, the direction of molecular orientation of such of said polyvinyl alcohol as carries the components of the right eye image being substantially at right angles to the direction of orientation of such of the polyvinyl alcohol as carries the left eye image, each image being formed of a plurality of superimposed dichroic color components, each component comprising the sorption complex on oriented polyvinyl alcohol of a direct cotton dye of the azo type.

10. Means providing superimposed right eye and left eye light-polarizing stereoscopic images in full color comprising overlying layers of molecularly oriented polyvinyl alcohol, the direction of molecular orientation of such of said polyvinyl alcohol as carries the components of the right eye image being substantially at right angles to the direction of orientation of such of the polyvinyl alcohol as carries the left eye image, each image being formed of a plurality of superimposed dichroic color components, each component comprising the sorption complex on oriented polyvinyl alcohol of a dichroic dye showing a ratio of densities for the absorbed component of transmitted light to the unabsorbed component thereof of more than 10 to 1.

11. In combination, a projector including a light source and means associated therewith for projecting on a screen a luminous image; means providing a pair of superimposed, light-polarizing stereoscopic images in full color, said means comprising molecularly oriented, transparent, linear, hydrophilic, polymeric plastic material carrying a plurality of dichroic color components of each of said images, the dichroic axes of the components of one image being substantially parallel, the dichroic axes of the components of the other image being substantially parallel and extending in a direction substantially perpendicular to the direction of extension of the dichroic axes of the components of the first-mentioned image, the optical density of each image being a function both of the direction of vibration of transmitted light and the wave length of said light; means for positioning said pair of stereoscopic images in the path of the light beam emanating from said projector; a non-depolarizing viewing screen positioned to receive the luminous image projected by said projector, and a viewing device for viewing said luminous image and comprising frame means providing eye apertures and a substantially colorless light-polarizing filter mounted in each aperture, the axes of said filters being substantially crossed.

12. In combination, a projector including a light source and means associated therewith for projecting on a screen a luminous image; means providing a pair of superimposed, light-polarizing stereoscopic images in full color, said means comprising molecularly oriented, transparent, linear, hydrophilic, polymeric plastic material carrying a plurality of dichroic color components of each of said images, the dichroic axes of the components of one image being substantially parallel, the dichroic axes of the components of the other image being substantially parallel and extending in a direction substantially perpendicular to the direction of extension of the dichroic axes of the components of the first-mentioned image, the optical density of each image being a function both of the direction of vibration of transmitted light and the wave length of said light; means for positioning said pair of stereoscopic images in the path of the light beam emanating from said projector; a quarter-wave device positioned in the path of said light beam after it has traversed said image-providing means, said quarter-wave device having its principal optical direction bisecting the angle formed by the intersection of the directions of extension of said dichroic axes; a non-depolarizing viewing screen positioned to receive the luminous image projected by said projector, and a viewing device for viewing said luminous image and comprising frame means providing eye apertures and a substantially colorless analyzer for circularly polarized light mounted in each eye aperture.

13. An article of manufacture comprising a sheet of a transparent, hydrophilic, linear polymeric plastic having a molecularly oriented surface, predetermined areas of said oriented surface having incorporated therein a subtractive, dichroic dye, said dyed areas forming in combination a predetermined image, said image comprising a color component of a predetermined image in full color.

14. As a new article of manufacture, a light-polarizing reproduction of a predetermined image in full color, comprising in combination, a sheet of a molecularly oriented, transparent, hydrophilic, linear polymeric plastic, predetermined areas of said sheet having incorporated therein a plurality of subtractive, dichroic dyes, the areas dyed with each of said dyes forming in combination a predetermined image comprising a color component of said full color image, said component images being positioned in substantial relative registry and forming in combination, in light vibrating substantially parallel to a predetermined direction, a reproduction in full color of said full color image.

15. An article of manufacture comprising a sheet of polyvinyl alcohol having a molecularly oriented surface, predetermined areas of said oriented surface having incorporated therein a subtractive, dichroic dye, said dyed areas forming in combination a predetermined image, said image comprising a color component of a predetermined image in full color.

16. As a new article of manufacture, a light-polarizing reproduction of a predetermined image in full color, comprising in combination, a sheet of molecularly oriented polyvinyl alcohol, predetermined areas of said sheet having incorporated therein a plurality of subtractive, dichroic dyes, the areas dyed with each of said dyes forming in combination a predetermined image comprising a color component of said full color image, said component images being positioned in substantial relative registry and forming in combination, in light vibrating substantially parallel to a predetermined direction, a reproduction in full color of said full color image.

17. As a new article of manufacture, a light-polarizing reproduction of a predetermined image in full color, comprising in combination, a sheet of a molecularly oriented, transparent, hydrophilic, linear polymeric plastic, predetermined areas of said sheet having incorporated therein from one to at least three subtractive, dichroic dyes, the areas dyed with each of said dyes forming in combination a predetermined image comprising a color component of said full color image, said component images comprising respectively a cyan component, a magenta component, and a yellow component, and forming in combination, in light vibrating substantially parallel to a predetermined direction, a reproduction in full color of said full color image.

18. As a new article of manufacture, a light-polarizing reproduction of a predetermined image in full color, comprising in combination, a plurality of superimposed, molecularly oriented layers of a transparent, hydrophilic, linear polymeric plastic, said layers being positioned with their respective directions of molecular orientation relatively parallel, predetermined areas of each of said layers having incorporated therein a subtractive, dichroic dye, said dyed areas in each of said layers forming in combination a predetermined image comprising a color component of said full color image, said component images being positioned in substantial relative registry and forming in combination, in light vibrating substantially parallel to a predetermined direction, a reproduction in full color of said full color image.

19. As a new article of manufacture, a light-polarizing reproduction of a predetermined image in full color, comprising in combination, a plurality of superimposed, molecularly oriented layers of polyvinyl alcohol, said layers being positioned with their respective directions of molecular orientation relatively parallel, predetermined areas of each of said layers having incorporated therein a subtractive, dichroic dye, said dyed areas in each of said layers forming in combination a predetermined image comprising a color component of said full color image, said component images being positioned in substantial relative registry and forming in combination, in light vibrating substantially parallel to a predetermined direction, a reproduction in full color of said full color image.

20. As a new article of manufacture, a light-polarizing reproduction of a predetermined image in full color, comprising in combination, at least three superimposed, molecularly oriented layers of a transparent, hydrophilic, linear polymeric plastic, said layers being positioned with their respective directions of molecular orientation relatively parallel, predetermined areas of each of said layers having incorporated therein a subtractive, dichroic dye, said dyed areas in each of said layers forming in combination a predetermined image comprising a color component of said full color image, said component images being positioned in substantial relative registry and forming in combination, in light vibrating substantially parallel to a predetermined direction, a reproduction in full color of said full color image.

21. As a new article of manufacture, a light-polarizing reproduction of a predetermined image in full color, comprising in combination, at least three superimposed, molecularly oriented layers of polyvinyl alcohol, said layers being positioned with their respective directions of molecular orientation relatively parallel, predetermined areas of each of said layers having incorporated therein a subtractive, dichroic dye, said dyed areas in each of said layers forming in combination a predetermined image comprising a color component of said full color image, said component images being positioned in substantial relative registry and forming in combination, in light vibrating substantially parallel to a predetermined direction, a reproduction in full color of said full color image.

22. As a new article of manufacture, a light-polarizing reproduction of a predetermined image in full color, comprising in combination, at least three superimposed, molecularly oriented layers of a transparent, hydrophilic, linear polymeric plastic, said layers being positioned with their respective directions of molecular orientation relatively parallel, predetermined areas of each of said layers having incorporated therein a subtractive, dichroic dye, said dyed areas in each of said layers forming in combination a predetermined image comprising a color component of said full color image, said component images comprising a cyan component, a magneta component, and a yellow component, said component images being positioned in substantial relative registry and forming in combination, in light vibrating substantially parallel to a predetermined direction, a reproduction in full color of said full color image.

23. Means providing superimposed stereoscopic, light-polarizing images in full color, comprising in combination, a plurality of superimposed, molecularly oriented layers of a transparent, hydrophilic, linear polymeric plastic, predetermined areas of each of said layers having incorporated therein a plurality of subtractive dichroic dyes, the areas dyed with each of said dyes forming in combination a predetermined image comprising a color component of one of a pair of predetermined, full color stereoscopic images, there being a sufficient number of said component images to form in combination a full color reproduction of each of said full color images, so much of said plastic as bears the component images of one of said full color images being positioned with the direction of molecular orientation thereof substantially perpendicular to that of the remainder of said layers and with the images thereon in substantial relative registry.

24. Means providing superimposed stereoscopic, light-polarizing images in full color, comprising in combination, a plurality of superimposed, molecularly oriented layers of polyvinyl alcohol, predetermined areas of each of said layers having incorporated therein a plurality of subtractive dichroic dyes, the areas dyed with each of said dyes forming in combination a predetermined image comprising a color component of one of a pair of predetermined, full color stereoscopic images, there being a sufficient number of said component images to form in combination a full color reproduction of each of said full color images, so much of said layers as bear the component images of one of said full color images being positioned with the direction of molecular orientation thereof substantially perpendicular to that of the remainder of said layers and with the images thereon in substantial relative registry.

25. Means providing superimposed stereoscopic light-polarizing images in full color, comprising in combination, means providing a pair of superimposed, molecularly oriented layers of a transparent, hydrophilic, linear polymeric plastic, said layers being positioned with their respective directions of molecular orientation relatively perpendicular, predetermined areas of one of said layers having incorporated therein a plurality of subtractive dichroic dyes, the areas dyed with each of said dyes forming in combination a predetermined image comprising a color component of one of a pair of predetermined, full color stereoscopic images, said component images being positioned in substantial relative registry and forming in combination, in light vibrating substantially parallel to a predetermined direction, a reproduction in full color of one of said full color images, predetermined areas of the other of said layers having incorporated therein a corresponding plurality of subtractive dichroic dyes, the areas dyed with each of said dyes forming in combination a predetermined image comprising a color component of the other of said pair of full color images, said component images being positioned in substantial relative registry and forming in combination, in light vibrating substantially at right angles to said first named vibration direction, a reproduction in full color of said other of said pair of full color images, said layers being positioned with the respective full color images therein in relative stereoscopic registry.

26. Means providing superimposed stereoscopic light-polarizing images in full color, comprising in combination, means providing a pair of superimposed, molecularly oriented layers of polyvinyl alcohol, said layers being positioned with their respective directions of molecular orientation relatively perpendicular, predetermined areas of one of said layers having incorporated therein a plurality of subtractive dichroic dyes, the areas dyed with each of said dyes forming in combination a predetermined image comprising a color component of one of a pair of predetermined, full color stereoscopic images, said component images being positioned in substantial relative registry and forming in combination, in light vibrating substantially parallel to a predetermined direction, a reproduction in full color of one of said full color images, predetermined areas of the other of said layers having incorporated therein a corresponding plurality of subtractive dichroic dyes, the areas dyed with each of said dyes forming in combination a predetermined image comprising a color component of the other of said pair of full color images, said component images being positioned in substantial relative registry and forming in combination, in light vibrating substantially at right angles to said first named vibration direction, a reproduction in full color of said other of said pair of full color images, said layers being positioned with the respective full color images therein in relative stereoscopic registry.

27. Means providing superimposed stereoscopic, light-polarizing images in full color, comprising in combination, a pair of molecularly oriented layers of a transparent, hydrophilic, linear polymeric plastic, predetermined areas of one of said layers having incorporated therein a plurality of subtractive dichroic dyes, the areas dyed with each of said dyes forming in combination a predetermined image comprising a color component of one of a pair of predetermined, full color stereoscopic images, said component images being positioned in substantial relative registry and forming in combination, in light vibrating substantially parallel to a predetermined direction, a reproduction in full color of one of said full color images, predetermined areas of the other of said layers having incorporated therein a corresponding plurality of subtractive dichroic dyes, the areas dyed with each of said dyes forming in combination a predetermined image comprising a color component of the other of said pair of full color images, said component images being positioned in substantial relative registry and forming in combination, in light vibrating substantially at right angles to said first named vibration direction, a reproduction in full color of said other of said pair of full color images, and means for positioning said layers with their respective directions of molecular orientation relatively perpendicular and with the respective full color images therein in relative stereoscopic registry.

28. Means providing superimposed stereoscopic, light-polarizing images in full color, comprising in combination, a pair of molecularly oriented layers of polyvinyl alcohol, predetermined areas of one of said layers having incorporated therein a plurality of subtractive dichroic dyes, the areas dyed with each of said dyes forming in combination a predetermined image comprising a color component of one of a pair of predetermined, full color stereoscopic images, said component images being positioned in substantial relative registry and forming in combination, in light vibrating substantially parallel to a predetermined direction, a reproduction in full color of one of said full color images, predetermined areas of the other of said layers having incorporated therein a corresponding plurality of subtractive dichroic dyes, the areas dyed with each of said dyes forming in combination a predetermined image comprising a color component of the other of said pair of full color images, said component images being positioned in substantial relative registry and forming in combination, in light vibrating substantially at right angles to said first named vibration direction, a reproduction in full color of said other of said pair of full color images, and means for positioning said layers with their respective directions of molecular orientation relatively perpendicular and with the respective full color images therein in relative stereoscopic registry.

29. Means providing superimposed stereoscopic, light-polarizing images in full color, comprising in combination, a pair of sheets of a transparent, hydrophilic, linear polymeric plastic, each of said sheets comprising at least two molecularly oriented layers having their directions of molecular orientation relatively parallel, predetermined areas of each of said layers having incorporated therein a subtractive, dichroic dye, said dyed areas in each of said layers forming in combination, a predetermined image comprising a color component of one of a pair of predetermined, full color stereoscopic images, the component images in one of said sheets being positioned in substantial relative registry and forming in combination, in light vibrating substantially parallel to a predetermined direction, a reproduction in full color of one of said pair of full color images, the component images in the other sheet similarly forming, in light vibrating at right angles to said first named vibration direction, a reproduction in full color of the other of said pair of full color images, and means for positioning said sheets with their respective directions of molecular orientation relatively perpendicular and with the respective full color images therein in relative stereoscopic registry.

30. Means providing superimposed stereoscopic, light-polarizing images in full color, comprising in combination, a pair of sheets of a transparent, hydrophilic, linear polymeric plastic, each of said sheets comprising three molecularly oriented layers having their directions of molecular orientation relatively parallel, predetermined areas of each of said layers having incorporated therein a subtractive, dichroic dye, said dyed areas in each of said layers forming in combination, a predetermined image comprising a color component of one of a pair of predetermined, full color stereoscopic images, said components comprising respectively a cyan component, a magenta component, and a yellow component, the component images in one of said sheets being positioned in substantial relative registry and forming in combination, in light vibrating substantially parallel to a predetermined direction, a reproduction in full color of one of said pair of full color images, the component images in the other sheet similarly forming, in light vibrating substantially at right angles to said first named vibration direction, a reproduction in full color of the other of said pair of full color images, and means for positioning said sheets with their respective directions of molecular orientation relatively perpendicular and with the respective full color images therein in relative stereoscopic registry.

31. Means providing superimposed stereoscopic light-polarizing images in full color, comprising in combination, a plurality of overlying, molecularly oriented layers of a transparent, hydrophilic, linear polymeric plastic, each of said images comprising a plurality of superimposed, light-polarizing, color components, each of said components comprising the sorption complex on said oriented plastic of a dichroic dye, the direction of molecular orientation of such of said plastic as carries the components of one of said stereoscopic images being substantially perpendicular to the direction of molecular orientation of such of said plastic as carries the components of the other of said stereoscopic images.

32. Means providing superimposed stereoscopic light-polarizing images in full color, comprising in combination, a plurality of overlying, molecularly oriented layers of polyvinyl alcohol, each of said images comprising a plurality of superimposed, light-polarizing, color components, each of said components comprising the sorption complex on said oriented polyvinyl alcohol of a dichroic dye, the direction of molecular orientation of such of said layers as carries the components of one of said stereoscopic images being substantially perpendicular to the direction of molecular orientation of such of said layers as carries the components of the other of said stereoscopic images.

EDWIN H. LAND.